United States Patent [19]

Kupske

[11] Patent Number: 4,811,763
[45] Date of Patent: Mar. 14, 1989

[54] ARRANGEMENT FOR FILLING FUEL TANKS OF MOTOR VEHICLES, ESPECIALLY OF MOTORCYCLES

[75] Inventor: Peter Kupske, Bieberach, Fed. Rep. of Germany

[73] Assignee: Bayerische Motoren Werke Aktiengesellschaft, Munich, Fed. Rep. of Germany

[21] Appl. No.: 89,946

[22] Filed: Aug. 26, 1987

Related U.S. Application Data

[63] Continuation of Ser. No. 891,846, Aug. 1, 1986, abandoned.

[30] Foreign Application Priority Data

Aug. 2, 1985 [DE] Fed. Rep. of Germany ....... 3527773

[51] Int. Cl.$^4$ .............................................. B65B 3/00
[52] U.S. Cl. ...................................... 141/44; 141/285; 141/392; 220/85 F; 220/85 VR; 220/86 R
[58] Field of Search .................. 141/447, 46, 392, 285; 220/86 R, 85 R, 85 F, 85 SP, 85 VR, 85 S, 85 B, 85 VS

[56] References Cited

U.S. PATENT DOCUMENTS

| | | | |
|---|---|---|---|
| 2,409,532 | 10/1946 | Bentley et al. | 220/86 R |
| 2,466,075 | 4/1949 | Bentley et al. | 220/86 R |
| 2,466,076 | 4/1949 | Bentley et al. | 220/86 R |
| 2,483,816 | 10/1949 | Edwards | 220/86 R |
| 3,380,619 | 4/1968 | Boddle | 220/86 R |
| 3,911,977 | 10/1975 | Berger | 220/86 R X |
| 4,234,098 | 11/1980 | Miller et al. | 220/86 R |
| 4,235,263 | 11/1980 | Lake, Jr. | 141/1 |

FOREIGN PATENT DOCUMENTS

| | | |
|---|---|---|
| 2336214 | 2/1975 | Fed. Rep. of Germany . |
| 2718161 | 11/1978 | Fed. Rep. of Germany . |
| 1050512 | 1/1954 | France . |
| 237296 | 8/1945 | Switzerland . |
| 407863 | 9/1966 | Switzerland ............... 220/86 R |
| 150554 | 9/1920 | United Kingdom . |

Primary Examiner—Ernest G. Cusick
Attorney, Agent, or Firm—Barnes & Thornburg

[57] ABSTRACT

An arrangement for filling fuel tanks, especially non-vented motorcycle fuel tanks, which includes a cylinder secured at the tank walls, surrounding the tank filling opening and projecting into the tank, a short pipe piece adapted to be extended and retracted in the cylinder which is adapted to be stopped in its extended position projecting out of the tank walls and which has a length that corresponds essentially to the insertion depth of the discharge pipe of a filling nozzle with a suction device for the fuel vapor-air-mixture. The arrangement additionally includes a cover for closing off the filling opening when the short pipe piece is retracted and a seal for preventing the discharge of fuel vapor-air-mixture to the atmosphere during the filling of the tank. In order to prevent a discharge of fuel during the opening of the cover when the filling level is high, the cylinder includes at least one aperture through which the area above the filling level in the tank is adapted to be connected with the atmosphere when the short pipe piece is retracted. Furthermore, the seal is so arranged that with an extended short pipe piece the connection between the aperture and the atmosphere is closed off.

5 Claims, 1 Drawing Sheet

U.S. Patent  Mar. 14, 1989  4,811,763
FIG. 1
FIG. 2
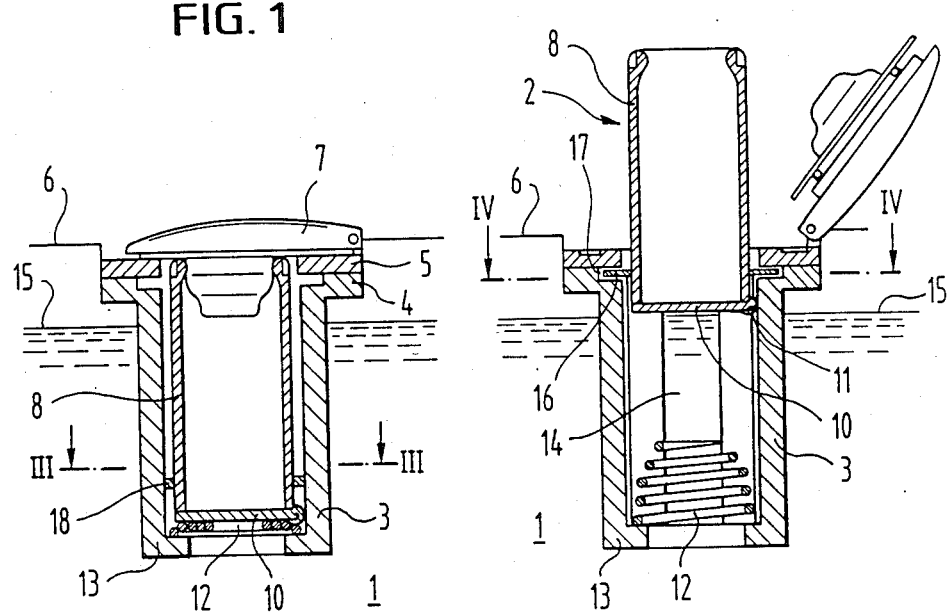
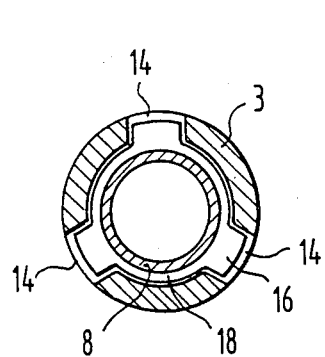
FIG. 3
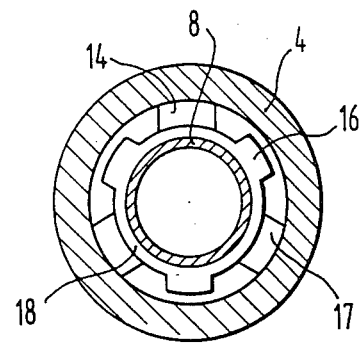
FIG. 4

ARRANGEMENT FOR FILLING FUEL TANKS OF MOTOR VEHICLES, ESPECIALLY OF MOTORCYCLES

This application is a continuation of U.S. patent application Ser. No. 891,846, filed Aug. 1, 1986, and now abandoned.

BACKGROUND AND SUMMARY OF THE INVENTION

The present invention relates to an arrangement for filling fuel tanks of motor vehicles, especially of motorcycles, with a cylinder secured at the tank walls, surrounding the tank filling opening and projecting into the tank, with a short pipe piece arranged to be extended out of and retracted into the cylinder, with a cover for closing the filling opening when the short pipe piece is retracted, and with a seal for avoiding the discharge of fuel vapor-air-mixture during the filling operation.

Such an arrangement is disclosed in the German Pat. No. 27 18 161. The short pipe piece is thereby adapted to be extended and retracted by threaded means. In order to prevent a discharge of fuel-air-mixture by way of the threads, a sealing ring is provided in a groove in the cylinder which abuts against the outer thread of the short pipe piece. During the operation, the tank must be vented. Without such venting, an excess pressure builds up in the tank, for example, when being warmed up, which would lead to the fuel being forced out during the opening of the closure cover and with a filling level above the lower end of the cylinder. However, fuel vapors are given off to the atmosphere during the operation of vented fuel tanks. For this reason vented tanks have already been prohibited in part by official regulations such as the California "Fuel Pipe Regulations".

A filling arrangement for a fuel tank is disclosed in the British Pat. No. 150,544 which includes a short pipe piece that is slidable in a cylinder arranged in the tank. For stopping the short pipe piece in the extended position during the filling of the tank, a nose is arranged at the lower end of the cylinder which engages in a longitudinal groove of the short pipe piece when the latter is extended, whereby after ths short pipe piece is pulled out and rotated, the nose engages the same from below. With this prior art arrangement, an existing excess pressure in the tank would lead with a high filling level, to the fuel being forced out during the opening of the closure cover. Therebeyond, the tank interior is in communication with the free atmosphere during the filling of the tank by way of the longitudinal groove so that fuel vapors can escape into the atmosphere during the filling operation.

The object of the present invention resides in providing an arrangement of the type described above, by means of which a discharge of fuel is prevented when opening of the closure cover with a high filling level, and more particularly with unvented fuel tanks.

The underlying problems are solved according to the present invention, in that the cylinder includes at least one aperture, through which the area above the filling level in the tank is adapted to be connected with the atmosphere when the short pipe piece is retracted, and the seal is arranged in such a manner that with an extended short pipe piece the connection between the aperture and the free atmosphere is closed off.

Thus, an arrangement for filling a fuel tank by means of a filling nozzle with a gas suction device is created by the present invention, and more particularly up to a maximum possible filling level, whereby a seal assures that during the filling no fuel vapors can leave between the pulled out short pipe piece and the guide cylinder. Therebeyond, however, the arrangement according to the present invention is intended for nonvented fuel tanks, i.e., for fuel tanks, especially for motorcycles, with a pressure-holding system so that also during the normal operation of the vehicle, no fuel vapors can be given off to the atmosphere, at least during normal operation. Of course, a safety valve is provided in the nonvented fuel tank in case of an excessively large excess pressure.

Therebeyond, the arrangement according to the present invention can be handled in a simple manner and can be manufactured with the use of relatively inexpensive materials such as plastic materials.

According to another feature of the present invention, a closure cover is provided at the inner end of the short pipe piece which is spring-loaded in the closing direction and opens into the tank. Such closure lid is of advantage because it additionally prevents a fuel discharge during the opening of the closure cover in the manner of a check valve and prevents an overfilling of the tank also with normal filling nozzles, i.e., with filling nozzles having only a cutoff contact at the free end of the discharge pipe. This is so as shortly before the maximum filling level is reached during the filling operation, the spring-loaded lid begins to close so that the filling level rises reltively rapidly in the short pipe piece and therewith actuates the contact, whereupon the fuel present in the short pipe piece flows slowly into the tank interior by way of the lid.

According to a still further feature of the present invention, a bayonet connection is provided for stopping the short pipe piece, whose ring groove is arranged at the upper end of the cylinder while the claws of the bayonet connection are arranged at an annular collar at the short pipe piece and the annular collar forms the seal by abutment at one of the side surfaces of the annular groove. This arrangement permits to integrate the seal into the bayonet connection for stopping the short pipe piece in the extended position, as a result of which the seal can be made by simple manufacture and with small space requirements.

According to still another feature of the present invention, the short pipe piece is spring-loaded into its extended position by a spring which is supported, on the one hand, at the cylinder and, on the other, at the lid. This represents an advantageous construction of the present invention because the spring not only facilitates the pulling out of the short pipe piece out of the cylinder, but additionally it prevents rattle noises as the short pipe piece is pressed against the closure cover during the operation of the vehicle.

These and other objects, features and advantages of the present invention will become more apparent from the following description when taken in connection with the accompanying drawing, which shows, for purposes of illustration only, one embodiment in accordance with the present invention, and wherein:

BRIEF DESCRIPTION OF THE DRAWINGS

FIG. 1 is a cross-sectional view through a filling arrangement in accordance with the present invention with a recessed short pipe piece during the opening of the closure cover;

FIG. 2 is a cross-sectional view, similar to FIG. 1, but showing the parts in the filling position, i.e., with a pulled-out and stopped short pipe piece;

FIG. 3 is a cross-sectional view taken along line III—III of FIG. 1; and

FIG. 4 is a cross-sectional view taken along line IV—IV of FIG. 2.

DETAILED DESCRIPTION OF THE DRAWINGS

Referring now to the drawing wherein like reference numerals are used throughout the various views to designate like parts, according to FIGS. 1 and 2, a fuel tank 1 includes a filling opening generally designated by reference numeral 2. The filling opening 2 is delimited by a cylinder means 3 that projects into the tank 1.

The cylinder 3 is provided with a flange 4 that is secured at a ring 5 which is welded to the tank wall 6. A customary closure cover means 7 is pivotally connected at the ring 5.

The cylinder means 3 forms the guidance for a short pipe piece 8 which is recessed in the cylinder means 3 when the cover means 7 is closed and which is pulled out of the cylinder means 3 during the filling operation so that it projects upwardly from the tank wall 6.

The length of the short pipe piece 8 thereby corresponds essentially to the insert depth of the discharge pipe of a conventional filling nozzle with a suction means for the fuel-air-mixture which escapes during the filling by way of the short pipe piece 8.

Such a discharge nozzle includes in general a hose, for example, in the form of a bellows which surrounds the discharge pipe and which comes into abutment during the insertion of the discharge pipe into the short pipe piece 8 at the upper edge of the short pipe piece 8 which is provided with a seal means, as a result of which it is pushed back. During the pushing back of the hose over the predetermined insertion depth, the same actuates a contact whereby the fuel pump is set into operation as also the suction means which sucks out the space between the hose and the discharge pipe. A further contact is provided at the free end of the discharge pipe. It is actuated when the filling level 15 reaches the maximum filling height, as a result of which the fuel pump and the suction means are turned off.

A closure lid 10 opening in the direction of the tank 1 is pivotally connected at the lower end of the short pipe piece 8. The closure lid 10 is thereby spring-loaded by a spring 11 into the closing position, i.e., in the upward direction.

Furthermore, a coil spring 12 is provided which is supported, on the one hand, at an inwardly projecting shoulder 13 at the lower end of the cylinder 3 and, on the other hand, with a closed filling arrangement according to FIG. 1, at the lid 10 of the short pipe piece 8. As a result thereof, the short pipe piece 8 is pressed against the cover 7 whereby rattle noises are prevented. Additionally, the short pipe piece 8 is pressed out of the tank 1 by the coil spring 12 during the opening whereby the short pipe piece 8 can be seized by hand and pulled out completely.

As can be seen in particular from FIGS. 2 and 3, aperture means 14 in the form of longitudinal slots are provided in the cylinder 3. The aperture means 14 extend thereby above the maximum filling level 15 in the upward direction up to the upper end of the cylinder 3.

As can be seen from FIG. 1, after the opening of the cover means 7, a connection is thereby established initially between the gas layer or the area in the tank above the filling level 15 and the atmosphere, and more particularly by way of the aperture means 14 as well as the annular space between the upper end of the cylinder means 3 and the short pipe piece 8. During the opening of the cover means 7, a pressure equalization is established in this manner beween the atmosphere and the gas layer in the tank 1 above the filling level 15. A throwing out of fuel during the opening operation by a pressure shock by way of the short pipe piece 8 is additionally prevented by the lid 10.

The stopping of the short pipe piece 8 in the filling position illustrated in FIG. 2 is attained by a bayonet connection means. For that purposes, claw means 16 are secured at the short pipe piece 8 which are guided in the aperture means, respectively, slots 14 in the cylinder means 3 as can be seen from FIG. 3. The annular groove 17 of the bayonet connection in which the claw means 16 are rotated when the short pipe connection 8 is pulled out, is provided between the flange 4 of the cylinder means 3 and the ring 5.

The claw means 16 are thereby not secured directly at the short pipe piece 8 but by way of an annular flange or collar 18 as can be seen in particular from FIG. 4. This annular flange 18 is pressed against the ring 5 when the bayonet connection means is closed. A seal is achieved in this manner which prevents that during filling of the tank 1, fuel vapor-air-mixture can escape into the atmosphere by way of the apertures 14 in the cylinder means 3.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangment for filling fuel tanks of motor vehicles, with venting of the tank to atmosphere upon opening of a filler cap to relieve excess pressure built up in the tank and with subsequent sealing of the venting to atmosphere to prevent escape of fuel vapors during fuel filling operations, comprising cylinder means secured at tank walls and surrounding a tank filling opening in said tank walls; said cylinder means projecting into the tank for containing a short pipe member arranged therein; said short pipe member being displaceably arranged in said cylinder means to be retracted and extended; said short pipe member being stoppable when extended at a position projecting out of the tank walls and having a length that corresponds essentially to an insertion depth of a discharge pipe of a filling nozzle equipped with a suction means for the fuel vapor-air-mixture; cover means for closing the filling opening and said short pipe member when retracted; seal means for preventing the discharge into the atmosphere of fuel vapor-air-mixture in the tank during the filling of the tank; the cylinder means being provided with at least one aperture means connected to the area above the filling level in the tank and with the atmosphere around a space between the cylinder means and said short pipe member when said short pipe member is retracted; said seal means closing the aperture means when said short pipe member is extended; a closure lid is provided at an end of the short pipe member, which closure lid is spring-loaded to a closing position and opens in a direction away from said tank filling opening; a bayonet connection means for stopping the short pipe member, said bayonet connection means including an annular groove defined by two lateral surfaces and one vertical surface, which annular groove is arranged at the upper end of the cylinder means; and wherein the short pipe member has an annular collar and the bayonet connection means includes claw means on said annular collar for stopping the short pipe member and wherein the annular collar forms the seal means by abutment at one of the lateral surfaces of the annular groove.

2. An arrangement according to claim 1, further comprising a spring for spring-loading the short pipe member in the direction of its extended position which is supported at one end at the cylinder means and on the other end at the short pipe member.

3. An arrangement according to claim 2 wherein the fuel tank is a motorcycle fuel tank.

4. An arrangement for filling fuel tanks of motor vehicles, with venting of the tank to atmosphere upon opening of a filler cap to relieve excess pressure built up in the tank and with subsequent sealing of the venting to atmosphere to prevent escape of fuel vapors during fuel filling operations, comprising cylinder means secured at tank walls and surrounding a tank filling opening in said tank walls; said cylinder means projecting into the tank for containing a short pipe member arranged therein; said short pipe member being retracted and extended; said short pipe member being stoppable when extended at a position projecting out of the tank walls and having a length that corresponds essentially to an insertion depth of a discharge pipe of a filling nozzle equipped with a suction means for the fuel vapor-air-mixture; cover means for closing the filling opening and said short pipe member when retracted; seal means for preventing the discharge into the atmosphere of fuel vapor-air mixture in the tank during the filling of the tank; the cylinder means being provided with at least one aperture means connected to the area above the filling level in the tank and with the atmosphere around a space between the cylinder means and said short pipe member when said short pipe member is retracted; said seal means closing the aperture means when said short pipe member is extended; bayonet connection means for stopping the short pipe member; said bayonet connection means including an annular groove defined by two lateral surfaces and one vertical surface, which annular groove is arranged at the upper end of the cylinder means; and wherein the short pipe member has an annular collar and the bayonet connection means includes claw means on said annular collar for stopping the short pipe member and wherein the annular collar forms the seal means by abutment at one of the lateral surfaces of the annular groove.

5. An arrangement for filling fuel tanks of motor vehicles, with venting of the tank to atmosphere upon opening of a filler cap to relieve excess pressure built up in the tank and with subsequent sealing of the venting to atmosphere to prevent escape of fuel vapors during fuel filling operations, comprising cylinder means secured at tank walls and surrounding a tank filling opening in said tank walls; said cylinder means projecting into the tank for containing a short pipe member arranged therein; said short pipe member being retracted and extended; said short pipe member being stoppable when extended at a position projecting out of the tank walls and having a length that corresponds essentially to an insertion depth of a discharge pipe of a filling nozzle equipped with a suction means for the fuel vapor-air-mixture; cover means for closing the filling opening and said short pipe member when retracted; seal means for preventing the discharge into the atmosphere of fuel vapor-air-mixture in the tank during the filling of the tank; the cylinder means being provided with at least one aperture means connected to the area above the filling level in the tank; and with the atmosphere around a space between the cylinder means and said short pipe member when said short pipe member is retracted; said seal means closing the aperture means when said short pipe member is extended; and further comprising a spring for spring-loading the short pipe member in the direction of its extended position which is supported at one end at the cylinder means and on the other end at the short pipe member.

* * * * *